Sept. 22, 1959    F. J. DITTER    2,905,253
SOD CUTTING MACHINE
Filed April 25, 1955    3 Sheets-Sheet 1
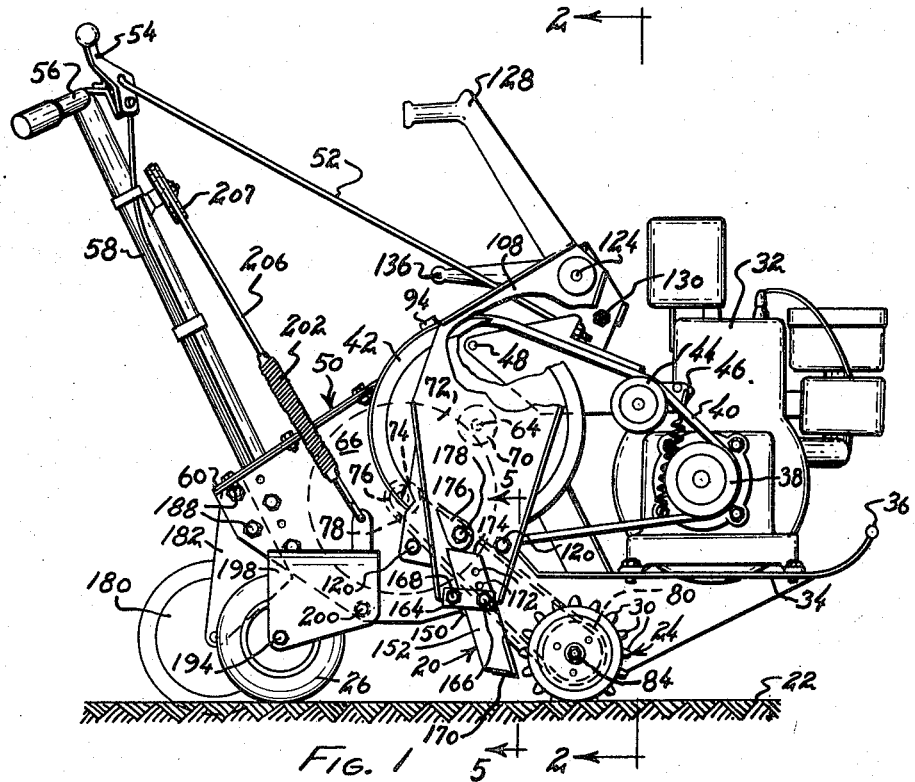
FIG. 1
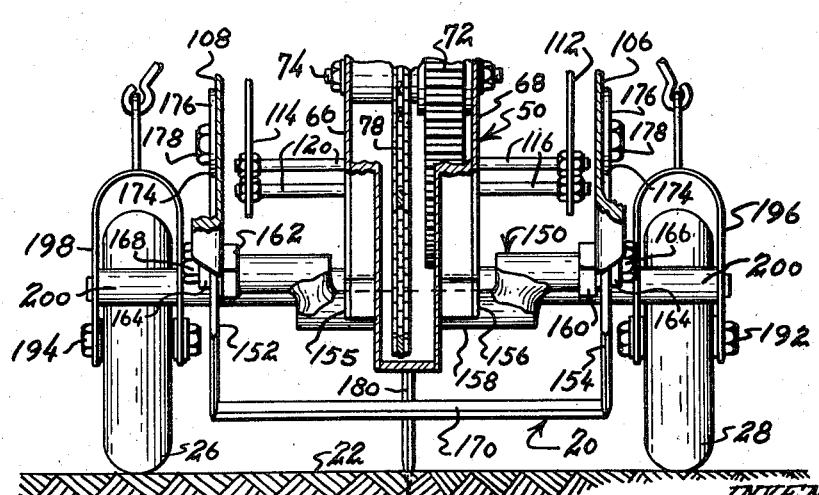
FIG. 5
FIG. 6
INVENTOR
FRANCIS J. DITTER
BY
William C. Stueber
ATTORNEY Sept. 22, 1959  F. J. DITTER  2,905,253
SOD CUTTING MACHINE
Filed April 25, 1955  3 Sheets-Sheet 3
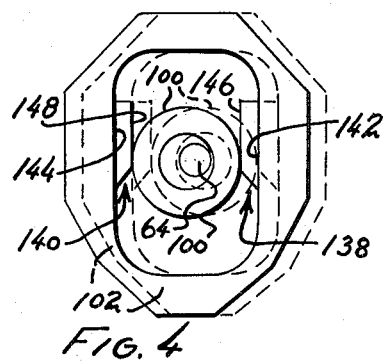
FIG. 4
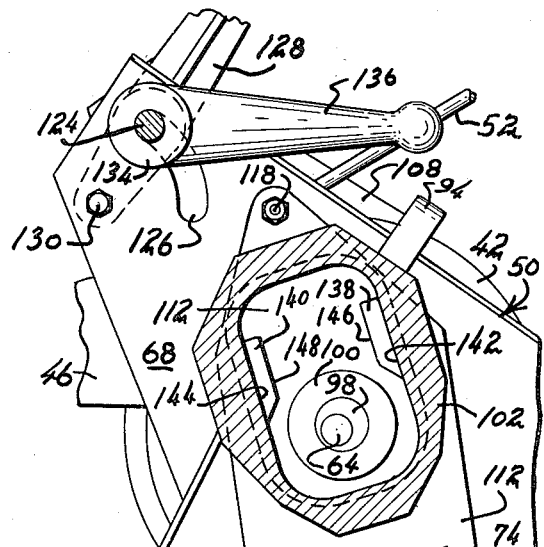
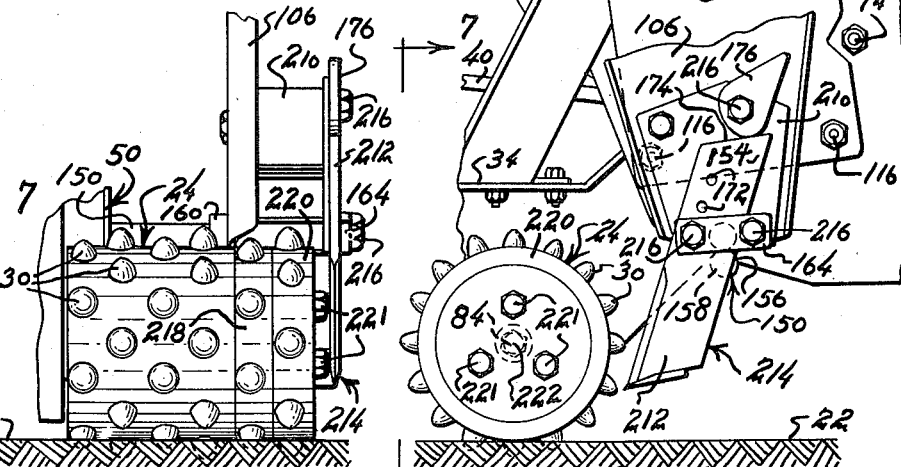
FIG. 7  FIG. 3
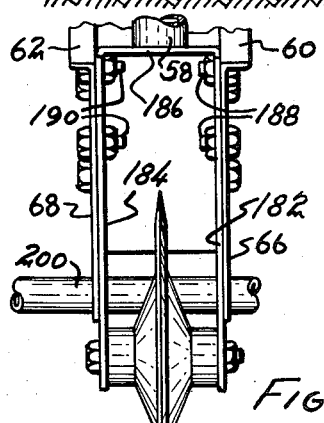
FIG. 8
INVENTOR
FRANCIS J. DITTER
BY
William C. Stueber
ATTORNEY

United States Patent Office 2,905,253
Patented Sept. 22, 1959

2,905,253

SOD CUTTING MACHINE

Francis J. Ditter, Minneapolis, Minn., assignor to Sod-Master Corporation, Minneapolis, Minn., a corporation of Minnesota Application April 25, 1955, Serial No. 503,496

7 Claims. (Cl. 172—19)

This invention relates to improvements in power sod cutters and more particularly to a manually controlled power driven machine which drives a sod cutting knife with an oscillatory motion and moves it forward through the turf to sever a strip of sod therefrom.

Power driven sod cutters have been used before in the art but disadvantages have accompanied certain features of these prior art machines. A need which an improved sod cutter must fulfill is to cleanly and evenly separate a strip of sod from the turf. It is often required that the thickness of the strip be changed because of certain requirements of the sod and because of the conditions of the turf which is cut. The machine must therefore be adjustable to various depths of cut without hampering or hindering the effectiveness of the oscillating motion of the sod cutting knife.

The evenness and general quality of the strip of sod which is cut will depend to a large degree upon the operator's being able to satisfactorily control and regulate the machine. To accomplish this end, the machine must be well balanced and it must be easily and readily adjustable to achieve the operation desired, prevent damage to the machine, and save the operator's time. The machine must be well balanced so as to be easy to handle and to reduce vibration, to thereby also increase the length of service of the parts.

It is an object of my invention to provide an improved power sod cutter which has improved handling ability and which is easily and readily controlled and adjusted by the operator.

Another object of my invention is to provide a sod cutter with improved cutting capabilities and in which the sod cutting blade can be accurately adjusted for depth of cut without reducing the efficiency of the other operating features of the blade.

Another object of the invention is to provide a sod cutter in which the oscillating motion of the cutting blade will be automatically stopped when the blade is raised from the ground.

Another object of my invention is to provide a power sod cutter in which the oscillating motion of the cutting blade can be stopped without stopping the forward progress of the machine and the forward motion of the machine can be stopped without terminating the oscillating motion of the cutting blade.

A still further object of the invention is to provide an improved attachment and position setting mechanism for joining the blade to its operating mechanism.

A further object of the invention is to provide a sod machine which is readily convertible to cut sod strips of different widths.

A further object of the invention is to provide a single machine which is capable of cutting a strip of sod from the turf and can also be used to cut endless strips of sod to the desired lengths.

Another object of the invention is to provide an improved mechanism for locking the sod cutting blade against motion when it is lifted out of the ground.

Other objects and advantages will become more apparent in the following specification taken in connection with the drawings.

Figure 1 of the drawings is a side elevational view of the entire sod cutting machine with certain parts broken away for clarity.

Fig. 3 is a side elevational view of the machine illustrating in detail the mechanism for supporting and driving the sod cutting blade.

Fig. 4 is a detailed view of the eccentric drive and cam box for driving the sod cutting blade.

Fig. 5 is a sectional view taken along line 5—5 of Fig. 1 and illustrating the mechanism for locking the cutting blade when it is lifted out of the ground.

Fig. 6 is a detailed perspective view of the spreader bar which is also illustrated in Fig. 4.

Fig. 7 is a detailed view taken along line 7—7 of Fig. 3 and illustrating the apparatus used to extend the cutting blade and drive roller to cut a wider strip of sod, and Fig. 8 is an elevational view taken from the rear of the machine but illustrating only the coulter wheel and its attachment to the machine.

Figure 2:
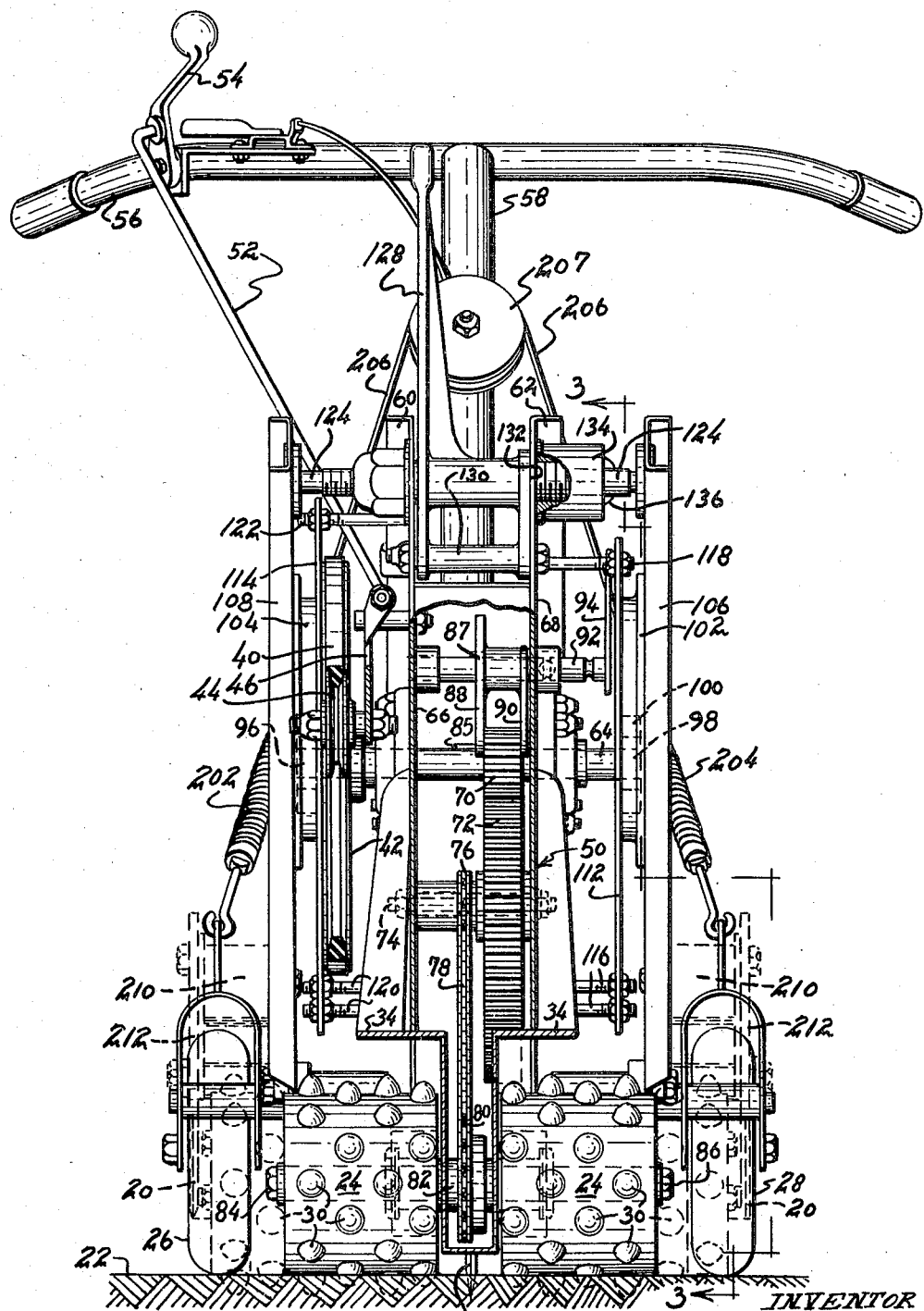
Fig. 2 is a view of the entire machine taken along a line 2—2 of Fig. 1.

The sod cutting machine is shown in its entirety in Fig. 1 as it would appear when ready to be used in the field. The sod cutting blade 20, however, is shown in a raised non-cutting position spaced from the surface of the ground 22.

The machine is supported for rolling movement in a forward direction on a traction drive roller 24 and on rear wheels 26 and 28, the traction roller and rear wheels also being shown in Figs. 2 and 5.

The traction roller is provided with rubber knobs 30 which dig into the turf to pull the machine forward and these knobs are designed to be self-cleaning and to positively grip wet and slippery turf as well as hard ground. The small broad design of the roller lowers the center of gravity of the machine and gives it greater stability and ease of handling.

The motive power for the machine is applied from a gasoline motor 32 which is supported on the frame 34. The frame is curved upwardly at its forward end and attaches to a crossbar 36 which protects the motor and serves as a bumper to deflect objects which are in the path of the machine and also as a support for the machine when it is tilted forward. This crossbar also may serve as a handle for carrying the machine.

The gasoline motor 32, Fig. 1, drives the traction roller 24 and furnishes power for oscillating the sod cutting blade 20. To this end power is transmitted from the drive pulley 38 of the motor by means of a belt 40 to the pulley 42.

The power receiving pulley 42 is placed in motion only when the belt 40 is tightened by the tightener pulley 44, Fig. 1. The tightener pulley is mounted on a tightener arm 46. The arm 46 is pivotally mounted at 48 on the gearbox 50 and to tighten the belt the tightener arm 46 is pivoted counterclockwise as shown in Fig. 1 by pulling rearwardly on the clutch rod 52. This clutch rod is controlled by a clutch arm 54 which is mounted on the handle bars 56 in a position easily accessible to the operator.

The handle bars are suitably secured to the top of a handle post 58 which is bolted to extension flanges 60 and 62 on the gearbox 50, these flanges also being shown in Fig. 8.

Returning now to the drive for the machine, when the belt 40 is tightened the gasoline motor will drive the pulley 42. This pulley is also illustrated in Fig. 2 and is secured to the eccentric cutter drive shaft 64. This eccentric shaft rotatably extends through the side walls 66 and 68 of the gearbox 50. The eccentric drive shaft is provided with eccentric ends and ball bearings over the eccentric ends for driving the cutting blade in a manner which will be described later. This drive shaft 64 also supports a driving pinion gear 70 which drives a bull gear 72.

The bull gear 72 is mounted on the bull gear shaft 74 which is rotatably journalled in the side walls 66 and 68 of the gearbox 50. The bull gear shaft 74 also carries a traction drive roller sprocket 76 which carries a chain 78 to drive another sprocket 80.

This sprocket 80 is mounted on a shaft 82, Fig. 2, which extends through the center of the traction roller 24. The traction roller shaft 82 has nuts 84 and 86 threaded to the ends for purposes of attaching traction roller extensions in a manner which will later be described.

It will be seen from Fig. 2 that as the drive belt 40 rotates the pulley 42 when the tightener pulley 44 tightens the belt, the sod machine will be driven forward by the motion transmitted through the pinion 70, bull gear 72, sprocket 76, chain 78, sprocket 80, and shaft 82.

As was previously mentioned, oscillatory motion of the cutting knife is also obtained through rotation of the drive shaft 64. The present sod machine is designed, however, to permit continued rotation of the drive shaft 64 and continued operation of the cutting knife after the forward motion of the machine is stopped.

To achieve this end, the pinion gear 70 is slidable on the drive shaft 64. The pinion 70 is connected with the shaft by a key 85 and the axial position of the pinion 70 is controlled by the clutch member 87. This member has two fingers 88 and 90 which project on each side of the pinion gear and when the clutch member 87 is slid to the left as shown in Fig. 2 the pinion 70 is moved out of mesh with the bull gear 72 and the bull gear is thus no longer driven, thus stopping the forward motion of the machine. The clutch member 87 is secured to a clutch shaft 92 which is slidably mounted in the walls 66 and 68 of the gearbox. The position of the clutch shaft 92 is controlled by manually pushing or pulling an arm 94 connected to the clutch shaft 92. This clutch arm 94 is also illustrated in Figs. 1 and 3.

Turning now to the drive mechanism for oscillating the cutting knife 20 in the ground, the drive shaft 64, Fig. 2, has eccentric ends 96 and 98 with the end 98 being shown in Fig. 3. The eccentric end carries a ball bearing 100 which is located within the cam box 102. The drive shaft 64, Fig. 2, rotatably extends through the gearbox walls 66 and 68. The eccentric ends and the ball bearings are located in the cam boxes 102 and 104 which are mounted on the inside of the moving arms 106 and 108.

It will be noted in Fig. 3 that the view is taken from the right side of Fig. 2 which is viewed from the front of the machine. The upper portion of the moving arm 106 is cut away so that the cam box 102 which is secured to the inside of the arm can be viewed.

The cam boxes 102 and 104 are welded or otherwise suitably secured to the moving arms 106 and 108. The moving arms are flat sections of sheet metal with flanged edges for strength and the flat surface of the arms closes the back of the cam boxes 102 and 104. The inside open faces of the cam boxes are closed by plates 112 and 114 which are stationarily secured to the sides of the gearbox. Plate 112, for example, Fig. 2, is secured by spacer bolts 116 and 118 projecting from the side wall 68 of the gearbox. Plate 114 is secured to the side 66 of the gearbox by similar spacer bolts 120 and 122.

It will thus be seen that the plates 112 and 114 are stationarily mounted on the sides of the gearbox and that the cam boxes 102 and 104 move with the moving arms 106 and 108 to slide against the stationary plates. The grease which is in the cam box to lubricate the ball bearing 100 at the ends of the eccentric drive shaft lubricates the relative movement between the cam box and the plates and also provides an effective seal to keep dust and dirt out of the cam boxes.

As may be seen from Figs. 2 and 3, the moving arms 106 and 108 carry the cutting knife 20 at their lower ends and are pivotally suspended at their upper ends on a support shaft 124. The support shaft is located for vertical movement in an arcuate slot 126, Fig. 3, this slot being cut in the upper extensions of the side walls 66 and 68 of the gearbox. It will be seen as the pivotal shaft 124 is lowered in the slot 126, the moving arms 106 and 108 which are supported therefrom will move downward to drop the cutting knife 20 into the turf 22. To permit this vertical adjustment, a depth of cut handle 128 supports the pivotal shaft 124 and is pivotally mounted on a pivot pin 130 secured between the plates 66 and 68, Fig. 2.

The depth of cut handle 128 has a cast lower end. This end has a flat surface 132, Fig. 2, which slides against the inner surface of the extension 68 of the gear case. On the opposite side of this extension is a depth adjusting locking hub 134 which is threaded to the arm supporting shaft 124. This hub has secured to it a depth adjustment locking handle 136, Fig. 1, which screws the hub up tight against the wall 68 and locks the cutting knife at its adjusted depth. When the depth adjusting handle 128 is pushed up or down to move the support shaft 124 to the desired position in the slot 126, Fig. 3, to thereby position the cutting blade 20 the right distance beneath the ground, the hub 134 is rotated by the depth adjusting locking handle to turn it against the plate 68 and lock the arm supporting shaft 124 in its adjusted position in the slot 126.

Thus, with reference to Fig. 1, it may be seen that from his position at the handle bars, the operator can bring the depth adjusting locking handle 136 to release the support shaft 124 and permit operation of the depth of cut handle 128. Moving the locking handle 136 to locking position will secure the depth of cut handle in the set position. This may be accomplished either during operation or while the machine is stopped but it can be readily and easily performed by the operator. It will be noted that these handles are in close proximity to the arm 94 which is used to engage or disengage the gears which drive the traction roller thus enabling easy operation by the operator.

An important feature of the machine is that the oscillating motion of the cutting knife 20 will automatically be stopped when the knife is moved to the raised position as is illustrated in Fig. 3. This feature will best be understood in connection with the description of the operation of the eccentric drive shaft 64.

Referring to Fig. 4, the machine parts are illustrated with the moving arms in the lowered position and the cutting knife 20 embedded in the turf. When the parts are in this relative position, the cam box 102, as shown in Figs. 3 and 4, and the cam box 104 at the other side of the machine are dropped in position with respect to the eccentric shaft so that the bearing 100 is positioned between the drive cams 138 and 140. These drive cams are small blocks attached to the inner walls 142 and 144 of the cam box and have flat vertical surfaces 146 and 148. These surfaces are spaced apart a distance equivalent to the diameter of the outer race of the ball bearing 100 so that it is snugly positioned between the vertical surfaces.

It will be noted from Fig. 4 that at any position of the ball bearing 100 between the solid line position or the dotted line position, any horizontal or lateral motion of the ball bearing will push against the cams 138 and 140 and cause a corresponding lateral motion of the cam box to cause the moving arms to swing. This lateral motion will, of course, occur when the shaft 64 is rotated since it has an eccentric end. Since the vertical surfaces of the drive cams leave the ball bearing free to move up and down, its vertical motion will have no effect on the moving arms to which the cam box is secured. The inner sides 142 and 144 of the cam box, Fig. 3, should be located so that they are approximately parallel to a line drawn between the arm supporting shaft 124 and the cutting knife 214 so that the lateral motion of the eccentric shaft will be the most effective in driving the cutting knife. The drive cams 138 and 140 are bolted to the inner sides of the cam box and may have shims added between them and the box when wear occurs on the cam surfaces so that the bearing will always be snugly held between the vertical surface of the cams.

The range of depth adjustment for the cutting blade lies between the full line position and the dotted line position of the eccentric shaft in Fig. 4. When the cutting blade is lifted from the ground, however, the cam box is raised to the position shown in Fig. 3 so that the bearing 100 of the eccentric shaft is in the lower open part of the cam box. In this position the bearing will move from contact with the drive cams because the bearing is below the inner vertical surfaces 146 and 148 of the cams. Thus when the blade is lifted from the ground, horizontal motion of the arms automatically stops.

It is important, however, that the ends of the shaft 64 be kept somewhere near the center of the cam box when it is in the position of Fig. 3 or the bearing will slap against the inside of the box and may cause damage or at least will cause undesirable vibration of the moving arms. To insure that the moving arms are positioned so that the shaft 64 is at the center of the cam box, the arms are automatically locked in neutral position when raised.

To accomplish this, the spreader bar 150, which extends between the vertical plates 152 and 154, Fig. 5, of the cutting blade 20, is moved into V-shaped notches 155 and 156 which are cut into the lower extensions of the side walls 60 and 62 of the gearbox 50. The spreader bar may have a central portion 158 which is offset from the main axis of the spreader bar so that it will rest in the notch when the moving arms 106 and 108 are in the proper neutral position.

The spreader bar is provided with bracket ends 160 and 162 in order that it may be bolted to the inner surface of the moving arms 106 and 108. The bolts extend through holes in the bracket ends and through a short clamping strap 164, Fig. 3, with the bolts being shown at 166 and 168. The strap 164 clamps against the vertical end 154 of the cutting knife and holds it snugly against the outer face of the moving arm.

The cutting blade 20 consists of a horizontal knife portion 170 which has a sharpened forward edge and vertical ends 152 and 154 which have sharpened forward edges. These vertical knife ends, as before described, are clamped against the moving arms by clamping straps such as shown at 164 in Fig. 3 and are provided with a series of holes 172 to adjust the vertical position of the cutting knife with respect to the moving arms.

The angle at which the blade 170 enters the ground while it is swung with an oscillatory horizontal motion is important to prevent vibration of the machine and to prevent uneven cutting. To adjust this position the vertical end 154 of the cutting blade as shown in Fig. 3 has a flat upper edge 174 against which bears the blade angle setting cam 176. This cam is clamped to the outer face of the moving arm 106 by a bolt 178. To adjust the angle at which the blade 170 enters the ground the cutting knife is tilted by first loosening the bolts 166 and 168. When the knife is in the correct tilted position the blade adjustment cam 176 is turned down against the top edge 174 of the blade portion 154 to lock it in position.

Referring back to Fig. 1, the sod machine is shown with the cutting knife 20 raised but with the cross cut coulter wheel 180 in the ground. The coulter is shown as a circular rotating blade with a sharpened edge but other types of cutting knives could be employed. During a normal sod cutting operation the coulter wheel 180 will be removed. Provided with the coulter wheel, the machine is capable of serving two purposes, of cutting endless strips of sod and of cross cutting the endless strips into the desired lengths.

After numerous strips of sod have been cut from a field, the cutting blade 20 is raised to the inoperative position of Fig. 1 and the coulter 180 is attached. The machine is then run crosswise across the field to cut the endless strips into the desired length.

The coulter is rotatably supported on a pair of brackets 182 and 184 as is illustrated in Figs. 1 and 8. The brackets are connected at their center by a joining member 186 and are connected to the machine by bolts 188 and 190 which pass through brackets 182 and 184 and the lower extensions 60 and 62 of the gear case side walls.

It will thus be seen that the coulter can be easily removed by removing the bolts 188 and 190 and stored while the machine is being used for cutting strips of sod and can be replaced for cross cutting the strips into lengths.

For ease in managing the machine and for reducing fatigue of the operator, the machine is supported by knee action type rear wheels. With reference to Figs. 1 and 5, the wheels 26 and 28 are supported on separate axles 192 and 194. These axles pass through U-shaped fenders 196 and 198. Each fender extends beyond the wheel at the forward end and is there pivotally connected to an axle 200 which extends across the machine, secured to the base of the gear case 50. It will thus be seen that each fender may pivot about the axle 200 and each individual wheel will be permitted to move up and down as its fender pivots.

The weight of the machine is supported on compensating springs 202 and 204 which connect to the forward edge of the fenders and urge them to pivot rearwardly to balance the machine on the wheel so as to hold the machine suspended above the ground. These springs connect to a cable 206 which passes over an equalizing pulley secured on the post 58. The equalizing pulley 207 equalizes the pressure on each of the wheels and permits one wheel to drop while the other rises, thus contributing to the knee-action effect of the rear supporting wheels.

It will thus be seen that when the machine encounters mounds or valleys, such as occur in rough terrain, either of the wheels can operate individually, reducing the resultant jarring of the machine and causing a smoother improved cut and reducing fatigue of the operator.

In many instances it may be desirable to change the width of the strip of sod which is cut. In the present embodiment this is simply done by removing the sod cutting blade and adding spacer members 210, Fig. 7, to the sides of the moving arms 106 and 108. These spacer members are then positioned between the vertical portion 212 of the wider sod blade 20 and the moving arm. A clamping arrangement similar to that shown in Fig. 1 may be used with the bolts 166 and 168 being replaced with longer bolts 216.

With an increased width of cut it is frequently desirable to increase the width of the traction roller 24 and to accomplish this, extensions 218 and 220 are added to its end in the manner shown in Fig. 7. Extension 218 has an opening in its center to accommodate bolt head 84. Then extension 220 of Fig. 3 is bolted to traction roller 24 through extension 218 by bolts 221.

It is to be particularly noted from Fig. 1 that the machine is well balanced with the center of gravity directly above the traction roller 24. An important feature of the machine resides in the fact that the moving arms are supported on a pivotal shaft 124 which is positioned directly vertically above the axis 222 of the traction roller. Thus any reactive forces caused by the cutting knife, as it goes through the ground, act directly through the pivotal support and act directly above the main support of the machine, which is the traction roller. This will greatly reduce the vibration of the machine and markedly reduce the force which must be applied by the operator to overcome vibration. The machine substantially is supported by the traction roller and the rear wheels 26 merely stabilize the support of the machine so that it is easily handled by the operator.

Thus it will be seen that I have provided an improved power sod machine which meets the objectives hereinbefore set forth and which provides a sod cutting machine which is extremely stable in operation, reducing operator fatigue and machine wear. The machine is easily and readily adjustable as to sod cutting depth and the operator has complete and selective control, being able to stop the entire machine by releasing the clutch or selectively stopping the movement of the cutting knife or the forward motion of the machine.

The machine is easily adaptable to the multiplicity of cutting conditions which a machine must encounter and accomplishes a greatly improved machine for the purposes set forth.

I have, in the drawings and specification, presented a detailed disclosure of the preferred embodiments of my invention. It is to be understood that the invention is susceptible of modifications, structural changes and various applications of use within the spirit and scope of the invention and I do not intend to limit the invention to the specific form disclosed but intend to cover all modifications, changes and alternative constructions and methods falling within the scope of the principles taught by my invention.

I claim as my invention:

1. A mechanism for cutting strips of sod comprising a member for supporting a sod-cutting blade and driving it through the ground with an oscillating motion, a driving member for said support for producing reciprocating motion in a horizontal direction of said member, a pair of vertical driven surfaces connected to the support and being positioned on each side of the driving member to cause the support to have horizontal movement therewith, and disengaging means connected to the support member and adapted to raise the support member to move said vertical surfaces above the driving member and permit the driving member to move freely without engaging the support member.

2. A mechanism for cutting strips of sod comprising a support member adapted to connect to a sod blade to drive it through the earth with an oscillating motion, a blade driving member adapted to be connected to the support member to impart oscillatory motion thereto, a blade position adjusting member connected to the blade support member and selectably moving the support member and blade to an adjusted position between a first lowered position deep in the earth and a second raised position out of the earth, and a pair of driven surfaces connected to the support member and positioned against opposite sides of the blade driving member when the support member is in said first lowered position to drive the support and blade in a horizontal oscillatory motion, said driven surfaces also positioned to be raised above the driving member as the blade is raised to its second raised position out of the earth to stop the motion of the blade.

3. A mechanism for cutting strips of sod comprising a pair of vertical cutting blade supporting members adapted to have a blade connected across the lower end thereof, a pivotal connection for the top ends of the blade supporting members, an adjustment means adjustably moving the supporting members to a plurality of vertical positions, a drive for effecting oscillatory motion in a horizontal direction of said blade-supporting members to pivot the blade-supporting members in a horizontal arcuate path about their pivotal connection to move the blade through the ground, and a pair of vertical cam surfaces on each support member with said drive contained between said surfaces through a number of adjusted vertical positions and the surfaces raised above the drive in the raised position to terminate the motion of the cutting blade.

4. A mechanism for cutting strips of sod comprising a pair of blade-supporting members extending vertically and adapted to support a sod blade at their lower ends, a pivotal mounting for the upper end of the supporting members, a rotatable drive mechanism having eccentric ends, a pair of vertical cam surfaces attached to each of the blade-supporting members and spaced apart the diameter of said eccentric ends, and adjustment means connected to vertically adjust the position of the blade-supporting members, the eccentric ends of the rotatable drive mechanism remaining between said cam surfaces until the supports are raised by said adjustment member to their uppermost position whereat the cam surfaces are moved clear of the eccentric ends and they are free to rotate freely with the support members given no horizontal movement.

5. A mechanism for cutting sod strips comprising a pair of driven supports for supporting a sod cutting blade at their lower ends, an adjusting crank arm mounted to pivot about a fixed pivot point, said driving supports pivotally connected at their upper ends to said crank arm to be moved in a vertical direction with pivotal movement of the crank arm, means to lock the crank member in its adjusted position to set the cutting depth of the cutting blade, a driving member for driving the supports to produce a horizontal oscillating motion thereof, and a pair of vertical cam surfaces connected to the support members and positioned with the driving member between them when the cutting blade is lowered into the earth to cause horizontal oscillation of the supports, the surfaces having diverging lower ends and being of a length that they will be raised away from the driving member when the driven supports are lifted by the crank arm to raise the cutting blade out of the ground.

6. A mechanism for cutting sod strips comprising a pair of movable arms for supporting a sod-cutting knife and forcing it through the turf with an oscillating motion, connection means for securing the knife to the lower ends of the arms, means to drive the movable arms with an oscillating reciprocatory motion, a clutch mechanism operable to disengage the drive means from the arms to stop the motion of the knife when said arms are raised a predetermined distance, first locking means associated with the arms, cooperating fixed second locking means above said first locking means adapted to engage the first locking means when the arms have been raised said predetermined distance, said locking means operable to automatically lock the movable arms against further motion upon operation of the clutch mechanism by raising said arms to disengage the drive means to prevent further movement of the arms.

7. A mechanism for cutting sod strips comprising a pair of spaced movable arms for supporting a sod-cutting knife and urging it through the sod with an oscillatory motion, means to drive the movable arms, means for connecting the knife to the arms, a spreader bar extending between the lower ends of the arms, clutch means for raising and lowering the arms connecting the drive means to the arms when the arms are in lowered position and disconnecting the drive means in raised position of the arms, and a locking member positioned above the spreader bar and having a recess for receiving the spreader bar to lock it and the arms against further movement when the arms are raised and the clutch is disengaged.

References Cited in the file of this patent

UNITED STATES PATENTS

| | | |
|---|---|---|
| 2,345,425 | Phillips | Mar. 28, 1944 |
| 2,369,514 | Zahodiakin | Feb. 13, 1945 |
| 2,645,439 | Gauthier | July 14, 1953 |
| 2,646,740 | Luoma | July 28, 1953 |
| 2,682,824 | Bowser et al. | July 6, 1954 |
| 2,702,502 | Rogneby | Feb. 22, 1955 |